United States Patent
Bodas et al.

(10) Patent No.: US 9,524,009 B2
(45) Date of Patent: Dec. 20, 2016

(54) MANAGING THE OPERATION OF A COMPUTING DEVICE BY DETERMINING PERFORMANCE-POWER STATES

(75) Inventors: Devadatta V. Bodas, Federal Way, WA (US); John H. Crawford, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 13/976,789

(22) PCT Filed: May 14, 2012

(86) PCT No.: PCT/US2012/037812
§ 371 (c)(1),
(2), (4) Date: May 30, 2014

(87) PCT Pub. No.: WO2013/172816
PCT Pub. Date: Nov. 21, 2013

(65) Prior Publication Data
US 2014/0281647 A1 Sep. 18, 2014

(51) Int. Cl.
| G06F 1/00 | (2006.01) |
| G06F 11/30 | (2006.01) |
| G06F 1/32 | (2006.01) |
| G06F 1/26 | (2006.01) |
| G06F 9/50 | (2006.01) |

(52) U.S. Cl.
CPC .............. *G06F 1/3206* (2013.01); *G06F 1/26* (2013.01); *G06F 1/3203* (2013.01); *G06F 9/5094* (2013.01); *Y02B 60/142* (2013.01)

(58) Field of Classification Search
CPC ......... G06F 1/3206; G06F 1/26; G06F 1/3203
USPC .......................................................... 713/340
See application file for complete search history.

(56) References Cited

U.S. PATENT DOCUMENTS

| 7,861,068 B2 | 12/2010 | Gorbatov et al. |
| 8,060,762 B2 | 11/2011 | Banginwar et al. |
| 2007/0011480 A1* | 1/2007 | Banginwar ........... G06F 1/3203 713/323 |

(Continued)

FOREIGN PATENT DOCUMENTS

| JP | H08503566 A | 4/1996 |
| KR | 20110038648 A | 4/2011 |

(Continued)

OTHER PUBLICATIONS

International Search Report and Written Opinion received for PCT Patent Application No. PCT/US2012/037812, mailed on Jan. 23, 2013, 10 pages.

*Primary Examiner* — Robert Cassity
(74) *Attorney, Agent, or Firm* — International IP Law Group, PLLC

(57) ABSTRACT

A method and system for managing the operation of a computing system are described herein. The method includes determining a number of workloads on the computing system. The method also includes determining a number of performance-power states for each workload and a corresponding performance range and power consumption range for each performance-power state. The method further includes managing performance and power consumption of the computing system based on the performance-power states.

25 Claims, 4 Drawing Sheets

(56) References Cited

U.S. PATENT DOCUMENTS

| | | | | |
|---|---|---|---|---|
| 2008/0235364 A1* | 9/2008 | Gorbatov | ............ | G06F 1/3203 709/224 |
| 2009/0138219 A1* | 5/2009 | Bletsch | ................ | G06F 1/3203 702/60 |
| 2009/0254660 A1* | 10/2009 | Hanson | .................. | H04L 12/10 709/226 |
| 2010/0262975 A1* | 10/2010 | Reysa | .................. | G06F 9/5077 718/105 |
| 2010/0281285 A1* | 11/2010 | Blanding | ............ | G06F 9/5027 713/324 |
| 2010/0299675 A1* | 11/2010 | Yuyitung | ............ | G06F 11/3495 718/105 |
| 2011/0022868 A1* | 1/2011 | Harchol-Balter | ..... | G06F 1/3203 713/323 |
| 2013/0111494 A1* | 5/2013 | Hyser | .................. | G06F 9/5094 718/105 |

FOREIGN PATENT DOCUMENTS

| | | |
|---|---|---|
| WO | 94/11801 | 5/1994 |
| WO | 2009/156447 A2 | 12/2009 |
| WO | 2013/172816 A1 | 11/2013 |

* cited by examiner

300

MANAGING THE OPERATION OF A COMPUTING DEVICE BY DETERMINING PERFORMANCE-POWER STATES

TECHNICAL FIELD

The present invention relates generally to the management of the operation of one or more computing systems. More specifically, the present invention relates to the determination of performance and power characteristics of one or more computing systems.

BACKGROUND ART

It is often desirable to determine specific data relating to the performance capabilities and power consumption characteristics of a computing system. Such data may be used to maintain an amount of power consumed by the computing system at an acceptable power level, or to maintain the performance of the computing system at an acceptable performance level. However, it is often difficult to simultaneously maintain both the power consumption and the performance of the computing system at acceptable levels. In many cases, this may be accomplished by throttling, e.g., lowering the frequency, of the computing system such that the power consumption stays below the acceptable power level. However, the amount of throttling for reaching a particular power level may vary by 5-10% due to variations in the power consumption characteristics of system components. Thus, appropriate determination of, and control over, the power consumption and performance of the computing system is often difficult to achieve.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
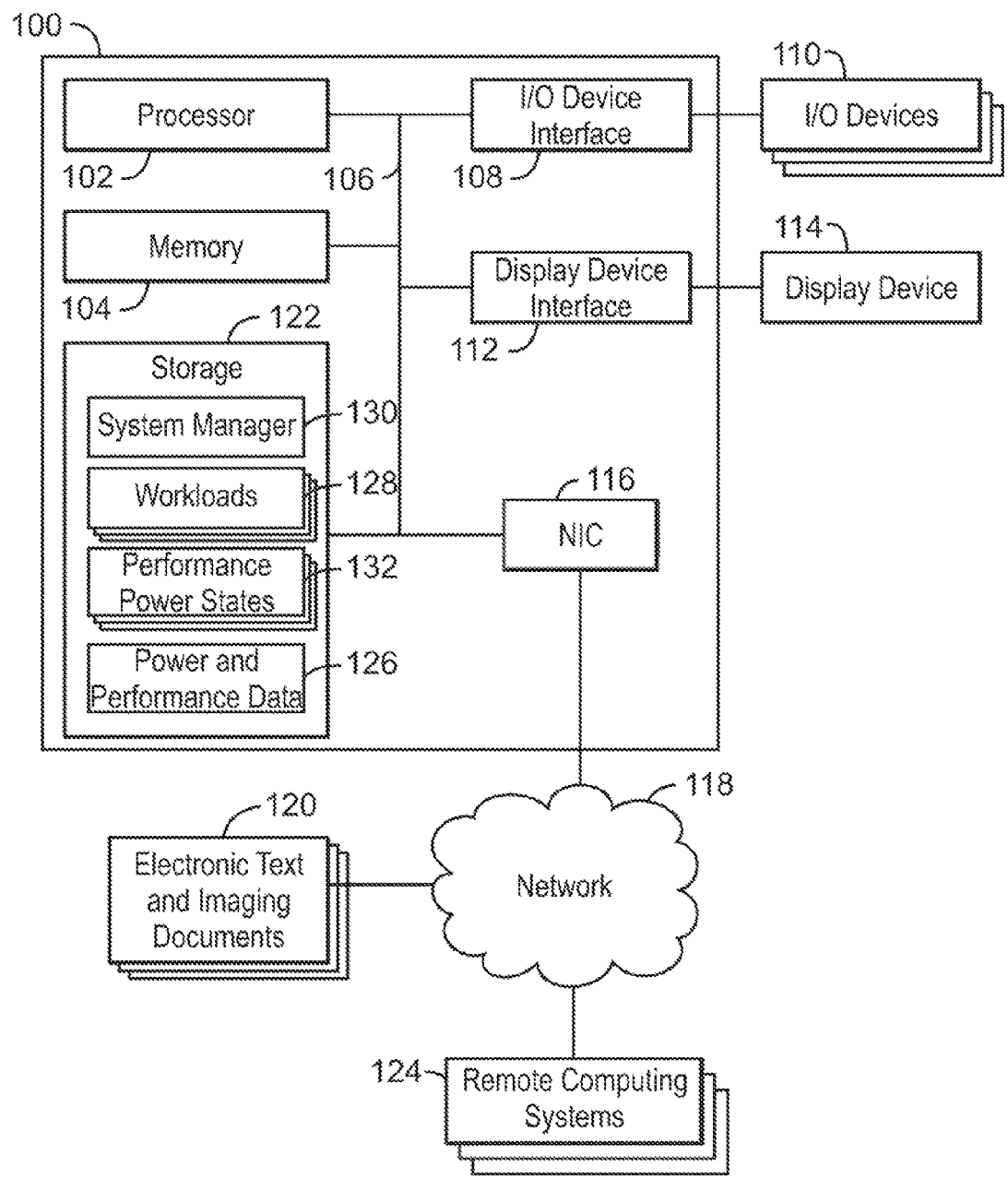
FIG. 1 is a block diagram of a computing system that may be used in accordance with embodiments.

As discussed above, embodiments described herein relate generally to the management of the operation of a computing system. More specifically, embodiments described herein relate to the determination of performance and power characteristics of a computing system. Such performance and power characteristics may be used, for example, to determine appropriate system operating configurations such that the power consumption and performance of the computing system are maintained at appropriate levels.

As used herein, the term "performance" refers to a response of a computing system during and after execution of a particular workload. In various embodiments, a definition of performance for a particular computing system may be defined by a user of the computing system via a user interface. The performance may be defined based on any of a number of different parameters, such as, for example, time of completion, frequency, response time, or frame rate. In various embodiments, the performance is defined based on architectural features of the computing system.

A computing system may operate in any number of system operational states. As used herein, the term "system operational state" refers to a state in which a computing system can run a specific workload by varying configurable parameters. According to embodiments described herein, a computing system may be operated in each system operational state for each of a number of workloads. Power consumption and performance data for each workload may be used to determine a number of system operational performance-power (SOPP) states for each workload. SOPP states may be generally referred to herein as "performance-power states."

Performance-power states are operational states in which a performance of the computing system is within a predefined performance range and a power consumption of the computing system is within a predefined power range. In addition, each performance-power state is separated from a previous or next performance-power state by a predefined performance and a predefined power consumption, as shown below in Eqs. 1 and 2.

$$\text{Performance}_{SOPP\ state_N} - \text{Performance}_{SOP\ state_{(N-1)}} > \Delta\text{Performance} \quad \text{Eq. 1}$$

$$\text{Power}_{SOPP\ state_N} - \text{Power}_{SOPP\ state_{(N-1)}} > \Delta\text{Power} \quad \text{Eq. 2}$$

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a computing system 100 that may be used in accordance with embodiments. The computing system 100 may be, for example, a mobile phone, laptop computer, desktop computer, tablet computer, or server, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (RAM), read only memory (ROM), flash memory, or any other suitable memory systems. The instructions that are executed by the processor 102 may be used to implement a procedure for managing the operation, e.g., the performance and power characteristics, of one or more computing systems.

The processor 102 may be connected through a bus 106 to an input/output (I/O) device interface 108 adapted to connect the computing system 100 to one or more I/O devices 110. The I/O devices 110 may include, for example, a keyboard and a pointing device, wherein the pointing device may include a touchpad or a touchscreen, among others. The I/O devices 110 may be built-in components of the computing system 100, or may be devices that are externally connected to the computing system 100.

The processor 102 may also be linked through the bus 106 to a display interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100.

A network interface controller (NIC) 116 may be adapted to connect the computing system 100 through the bus 106 to a network 118. The network 118 may be a wide area network (WAN), local area network (LAN), or the Internet, among others. Through the network 118, the computing system 100 may access electronic text and imaging documents 120. The computing system 100 may also download the electronic text and imaging documents 120 and store the electronic text and imaging documents 120 within a storage device 122 of the computing system 100.

Through the network 118, the computing system 100 may be communicatively coupled to a number of remote computing systems 124. In some embodiments, power and performance data 126 may be downloaded from the remote computing systems 124, and may be stored within the storage device 122 of the computing system 100. In addition, any number of workloads 128, or data relating to the workloads 128, may be downloaded from the remote computing systems 124, and may be stored within the storage device 122 of the computing system 100. Further, power and performance data 126 and any number of workloads 128 relating to the computing system 100 may be stored within the storage device 122 of the computing system 100.

The storage device 122 can include a hard drive, an optical drive, a thumbdrive, an array of drives, or any combinations thereof. The storage device 122 may include a system manager 130 that is configured to perform the techniques for managing the operation of computing systems that are described herein. In various embodiments, the system manager 130 may be used to generate a number of performance-power states 132 relating to any of the remote computing systems 124, as well as the computing system 100. The performance-power states 132 may also be stored within the storage device 122 of the computing system 100.

It is to be understood that the block diagram of FIG. 1 is not intended to indicate that the computing system 100 is to include all of the components shown in FIG. 1. Further, the computing system 100 may include any number of additional components not shown in FIG. 1, depending on the details of the specific implementation.

Figure 2:
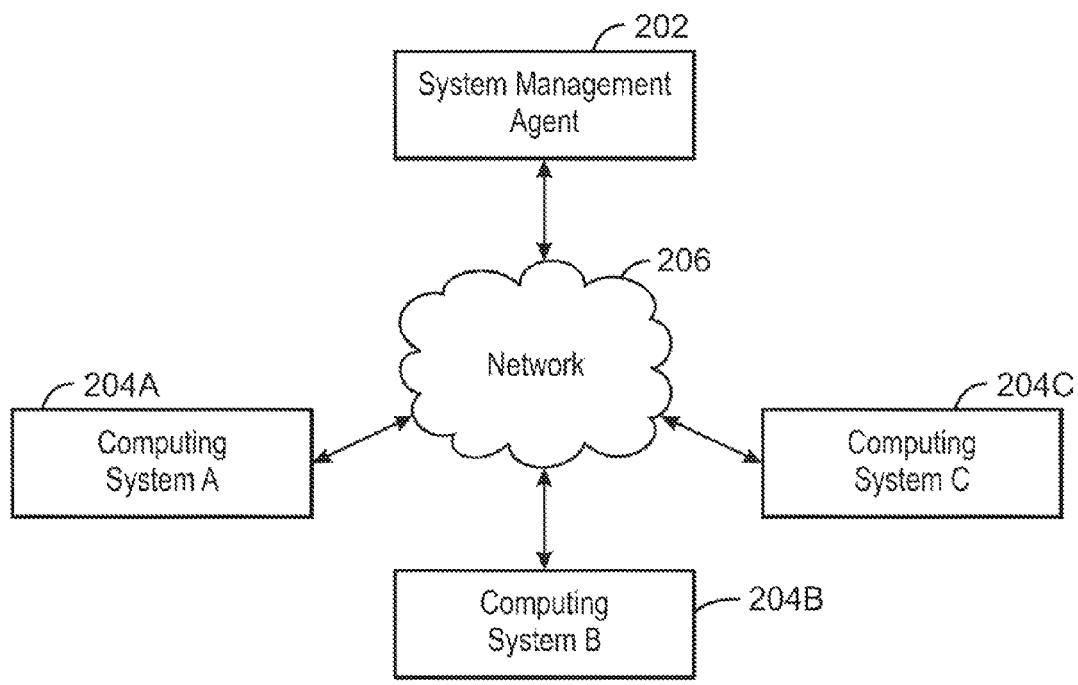
FIG. 2 is a block diagram of a computing environment that may be used to implement techniques for managing the operation of a computing system.

FIG. 2 is a block diagram of a computing environment 200 that may be used to implement techniques for managing the operation of a computing system. The computing environment 200 may include a system management agent 202. In some embodiments, the system management agent 202 is the system manager 130 stored within the computing system 100 discussed above with respect to FIG. 1. However, the system management agent 202 may be a program or application that is executed by any type of computing device. For example, the system management agent 202 may an automated program or an application within an information technology (IT) management program. In addition, the system management agent 202 may be a datacenter manager, a node manager, or a program operating at the basic I/O system (BIOS) level or operating system (OS) level of a computing system.

The computing environment 200 may also include a number of computing systems 204, e.g., computing system A 204A, computing system B 204B, and computing system C 204C, among others. The computing systems 204 may be communicatively coupled to the system management agent 202 via a network 206. The network 206 may be, for example, a WAN, LAN, or the Internet.

The computing systems 204 may be any types of computing devices, such as servers, laptop computers, desktop computers, tablet computers, or mobile devices, among others. In some embodiments, the computing systems 204 may be included within a distributed computing environment. The computing systems 204 may be homogeneous, meaning that all of the computing systems 204 include identical hardware and software configurations, or heterogeneous, meaning that any number of the computing systems 204 include disparate hardware or software configurations.

The system management agent 202 may be configured to perform a process for determining performance-power states for each of a number of workloads executed by any number of the computing systems 204. In some embodiments, the system management agent 202 may perform such a process in response to input from a user via a user interface, such as a graphical user interface (GUI). For example, the system management agent 202 may be controlled by input from a datacenter administrator or IT personnel, among others.

As discussed above, the performance of a computing system refers to the system response during and after execution of a particular workload. In various embodiments, the performance of a computing system is quantified according to a specific performance metric. The performance metric may be defined according to input from the user of the system management agent 202. The performance metric may be based on specific parameters. Such parameters may include, for example, a completion time for a particular workload, a responsiveness of the system, a frame rate, a number of transactions completed, a rate of completion, or a rate of communication, e.g., bandwidth, among others. In addition, the performance metric may be based on multiple individual parameters, or may be based on a statistical operation, e.g., a mean, of multiple parameters.

The system management agent 202 may create a number of possible system operational states for one of the computing systems 204 based on the architecture of the computing system 204. For example, any of a number of architectural features of the computing system 204 may be used to generate the system operational states. The system operational states may then be used to determine performance-power states for specific workloads that are executed by the computing system 204.

In various embodiments, architectural features that are used to generate the system operational states may include core frequencies, processor frequencies, non-core frequencies, or memory frequencies, among others. The term "frequency" refers to the number of occurrences of a repeating event per unit time. For example, the frequency, or clock rate, of a central processing unit (CPU) of the computing system 204 may be used to characterize the rate at which the CPU is running. As used herein, the term frequency may refer to a standard frequency, or a combination of voltage and frequency. In some embodiments, core frequencies include frequencies relating to a CPU of the computing system 204. Non-core frequencies, on the other hand, may include frequencies relating to last level caches, interconnects between various processor blocks, or various internal agent or integrated I/O controllers, among others.

Any number of architectural features may be enabled or disabled to aid in the determination of the system operational states. This may be particularly applicable to architectural features that are often used in parallel with one another, such as, for example, multiple execution units, multiple retirement units, queues, or multiple graphics engines, among others. In addition, parameters of certain operations may be varied to aid in the determination of the system operational states. Such parameters may include, for example, a display refresh rate or an image quality, among others. Further, certain architectural features may be "defeatured" to aid in the determination of the system operational states. This may include, for example, executing less instructions at a time, operating a vector processing unit at a lower capacity, or operating I/O communications links at a lower bandwidth.

In some embodiments, each of the computing systems 204 includes a corresponding local system management agent (not shown). In such embodiments, each local system management agent may be configured to perform the process for determining performance-power states for the corresponding computing system 204. The system management agent 202 may act as the central system management agent. The central system management agent 202 may be configured to compile data from the local system management agent on each computing system 204, and to generate performance and power information based on the performance-power states. For example, the central system management agent 202 may use the data from the local system management agents to generate performance-power state tables relating to the performance-power states for each type of workload on each type of computing system 204.

It is to be understood that the block diagram of FIG. 2 is not intended to indicate that the computing environment 200 is to include all of the components shown in FIG. 2. Further, the computing environment 200 may include any number of additional components not shown in FIG. 2, depending on the specific application.

Figure 3:
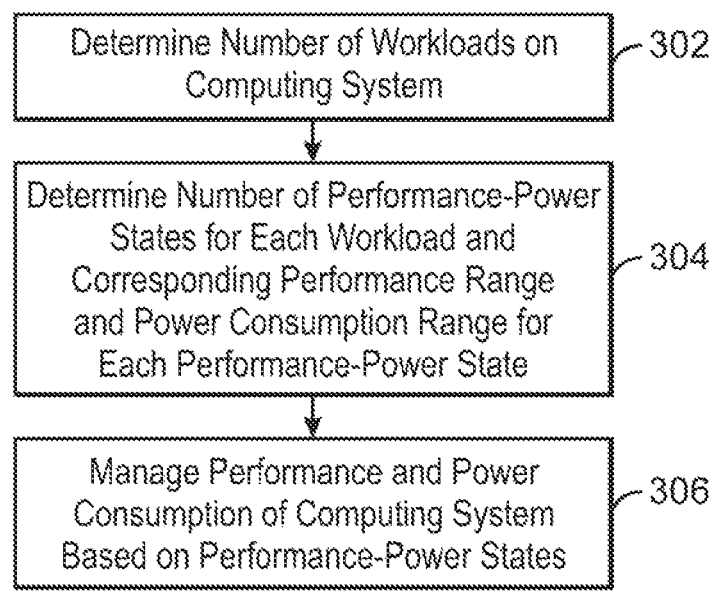
FIG. 3 is a process flow diagram showing a method for managing the operation of a computing system.

FIG. 3 is a process flow diagram showing a method 300 for managing the operation of a computing system. The method 300 may be used to determine performance and power consumption characteristics of a computing system. More specifically, the method 300 may be used to calibrate a computing system by determining performance-power states for the computing system.

In various embodiments, the computing system that is used according to the method 300 is the computing system 100 discussed above with respect to FIG. 1. In addition, the method 300 may be implemented within the computing environment 200 discussed above with respect to FIG. 2. Further, the method 300 may be implemented in response to input from a system manager, such as the system management agent 202.

In various embodiments, the method 300 may be initiated during the initial boot of the computing system using pre-loaded workloads, or may be initiated by an operating system or virtualized operating system on demand. In addition, the method 300 may be initiated in response to a request by the user of the computing system, or a request by users of other computing systems. Further, the method 300 may be performed while the computing system is being built and configured.

The method begins at block 302, at which a number of workloads on the computing system are determined. In addition, a number of parameters corresponding to each workload may be determined. The parameters corresponding to each workload may include a definition of performance for each workload. The definition of performance may be based on specific architectural features of the computing system, as discussed above with respect to FIG. 2. In addition, the parameters corresponding to each workload may include an acceptable power consumption range and an acceptable performance range for each workload. In some embodiments, a user of the computing system inputs the parameters corresponding to each workload via a user interface, such as a GUI.

At block 304, a number of performance-power states for each workload, as well as a corresponding performance range and power consumption range for each performance-power state, are determined. Each performance-power state represents a state in which the computing system is capable of running a specific workload within the corresponding performance range and power consumption range. The determination of the performance-power states may be accomplished by operating the computing system in each system operational state for each workload. Then, data relating to each system operational state for each workload may be processed. In various embodiments, the data may include information relating to a performance for each workload in each system operational state, and information relating to a power consumption of the computing system for each workload in each system operational state. The performance-power states may be determined from the data based on the system operational states, as well as the acceptable power consumption range and acceptable performance range for each workload. In various embodiments, each performance-power state is separated from a previous performance-power state and a next performance-power state by a minimum performance and a minimum power consumption.

At block 306, the performance and power consumption of the computing system are managed based on the performance-power states. This may include maintaining the power consumption below a predefined power limit and maintaining the performance above a predefined performance limit. In other embodiments, this includes maintaining the power consumption below a predefined power limit and maintaining the performance at a predetermined performance level. For example, the computing system may be maintained at the predetermined performance level to ensure that the operation of the computing system is compatible with the operation of any number of other computing systems that are communicatively coupled to the computing system.

In some embodiments, the performance-power states are used to determine operating configurations for the computing system such that a balance between performance and energy usage is achieved. The performance-power states may establish a metric of energy cost of performance, which may be used to provide a user of the computing system with a choice between efficient battery usage and high performance. For example, a user may use the performance-power states to maintain a highest performance of the computing system at a given rate of power usage. Further, in some embodiments, the performance-power states are used to maintain the power consumption of the computing system below a specified power consumption limit. This may allow for the maintenance of availability of the computing system during "brown out" conditions.

It is to be understood that the process flow diagram of FIG. 3 is not intended to indicate the steps of the method 300 are to be executed in any particular order, or that all of the steps of the method 300 are to be included in every case. Further, any number of additional steps may be included within the method 300, depending on the details of the specific implementation.

In various embodiments, the method 300 may be implemented for multiple computing systems. In such embodiments, the method 300 includes determining a number of workloads corresponding to the computing systems and parameters corresponding to each workload. The method 300 also includes determining a number of performance-power states for each workload and a corresponding performance range and power consumption range for each performance-power state. This may be accomplished by operating each computing system in each system operational state for each workload and processing data relating to each system operational state for each workload. The method 300 further includes managing performance and power consumption of the computing systems based on the performance-power states. This may include, for example, maintaining an overall power consumption of the computing systems below a power limit while maintaining the performance of the computing systems at a uniform performance level. Further, according to such embodiments, the method 300 may be implemented by a datacenter manager that is located outside the computing systems and is communicatively coupled to the computing systems.

Figure 4:
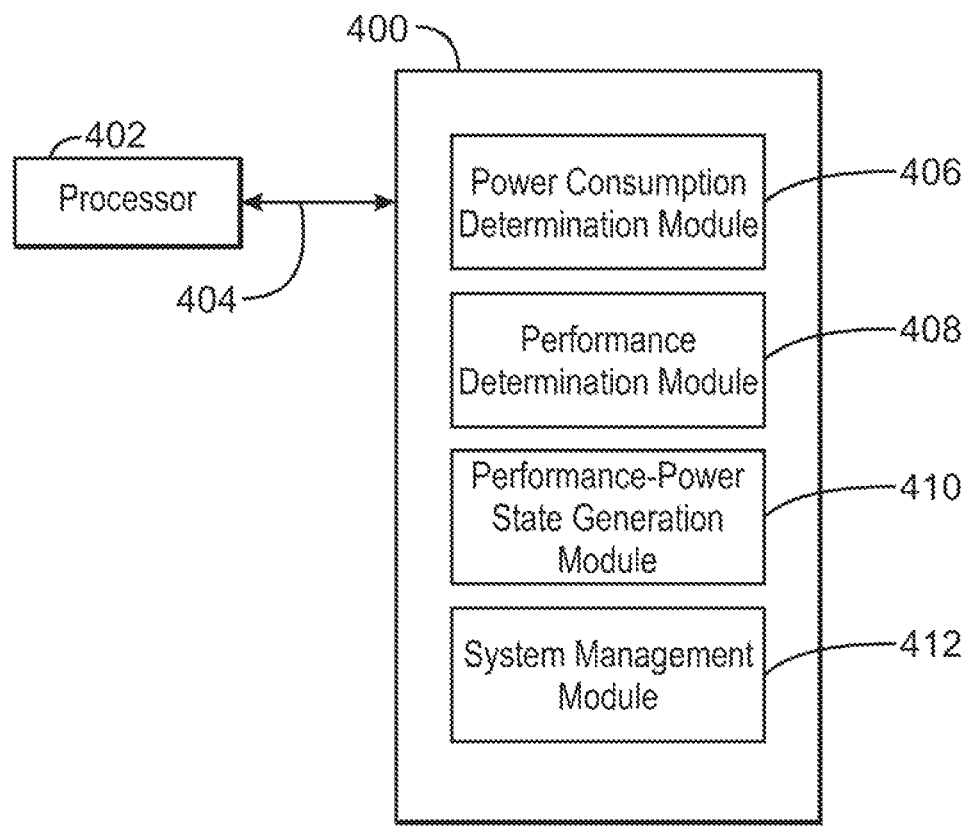
FIG. 4 is a block diagram showing a tangible, non-transitory computer-readable medium that stores code for managing the operation of a computing system.

FIG. 4 is a block diagram showing a tangible, non-transitory computer-readable medium 400 that stores code for managing the operation of a computing system. The tangible, non-transitory computer-readable medium 400 may be accessed by a processor 402 over a computer bus 404. Furthermore, the tangible, non-transitory computer-readable medium 400 may include code configured to direct the processor 402 to perform the techniques described herein.

The various software components discussed herein may be stored on the tangible, non-transitory computer-readable medium 400, as indicated in FIG. 4. For example, a power consumption determination module 406 may be configured to determine the power consumption of one or more computing systems in each system operational state for each of a number of workloads. A performance determination module 408 may be configured to determine the performance of the one or more computing systems in each system operational state for each of a number of workloads.

In addition, a performance-power state generation module 410 may be configured to generate a number of performance-power states for each workload based on the power consumption and performance data for each system operational state. A system management module 412 may be configured to control the operation, e.g., the power consumption and performance, of the one or more computing systems based on the performance-power states.

It is to be understood that the block diagram of FIG. 4 is not intended to indicate that the tangible, non-transitory computer-readable medium 400 is to include all of the components shown in FIG. 4. Further, any number of additional components may be included within the tangible, non-transitory computer-readable medium 400, depending on the details of the specific implementation.

Example 1

A method for managing the operation of a computing system is described herein. The method includes determining a number of workloads on the computing system. The method also includes determining a number of performance-power states for each workload and a corresponding performance range and power consumption range for each performance-power state. The method further includes managing performance and power consumption of the computing system based on the performance-power states.

Parameters corresponding to each workload may be determined by specifying a definition of performance for each workload. The definition of performance may be based on architectural features of the computing system. The definition of performance for each workload may be received from a user via a user interface.

The number of performance-power states for each workload may be determined by running each workload in each system operational state, measuring a performance of the computing system for each workload in each system operational state, and measuring a power consumption of the computing system for each workload in each system operational state. Further, the operation of the computing system may be managed in response to input from a system management agent. Managing the operation of the computing system may include maintaining the power consumption below a predefined power limit and maintaining the performance at a predefined performance level.

Each performance-power state may be separated from a previous performance-power state and a next performance-power state by a minimum power consumption and a minimum performance.

A number of workloads corresponding to a number of computing systems and parameters corresponding to each workload may be determined. A number of performance-power states for each workload and a corresponding performance range and power range for each performance-power state may be determined. The performance and power consumption of the computing systems may be managed based on the performance-power states. This may be performed in response to input from a datacenter manager located outside the computing systems. Managing the performance and the power consumption of the computing systems may include maintaining an overall power consumption of the computing systems below a power limit while maintaining the performance of the computing systems at a uniform performance level.

Example 2

A computing system including a processor that is adapted to execute stored instructions and a storage device that stores instructions is described herein. The storage device includes processor executable code that, when executed by the processor, is adapted to determine a number of workloads of the computing system. The processor executable code is also adapted to determine a number of performance-power states for each workload, wherein determining a performance-power state includes defining a performance level range and a power level range for the performance-power state. The processor executable code is further adapted to manage performance and power consumption of the computing system based on the performance-power states.

A system operational state is a state in which the computing system is capable of running a specific workload by varying configurable parameters. A performance-power state is a state in which the computing system is capable of running a specific workload within the performance level range and the power level range.

The processor executable code may be executed by the processor during an initial system boot. The processor executable code may be executed by the processor by an operating system on demand. The processor executable code may also be executed by the processor as a response to a request by a user of another computing system.

Each performance-power state may be separated from a previous performance-power state and a next performance-power state by a minimum power consumption and a minimum performance.

Example 3

At least one non-transitory machine readable medium having instructions stored therein is described herein. In response to being executed on a computing system, the instructions cause the computing system to determine a number of workloads of the computing system. The instructions also cause the computing system to determine a number of performance-power states for each workload and a corresponding performance range and power range for each performance-power state. In addition, the instructions cause the computing system to control performance and power consumption of the computing system based on the performance-power states.

A system operational state is a state in which the computing system is capable of running a specific workload by varying configurable parameters. A performance-power state is a state in which the computing system is capable of running a specific workload within a specified performance level range and a specified power level range.

Parameters corresponding to each workload may be determined by specifying a definition of performance for each workload based on any of a number of architectural features of the computing system. Controlling the performance and the power consumption of the computing system may include maintaining a highest performance of the computing system at a given rate of power usage.

It is to be understood that specifics in the aforementioned examples may be used anywhere in one or more embodiments. For instance, all optional features of the computing system described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein The inventions are not restricted to the particular details listed herein. Indeed, those skilled in the art having the benefit of this disclosure will appreciate that many other variations from the foregoing description and drawings may be made within the scope of the present inventions. Accordingly, it is the following dams including any amendments thereto that define the scope of the inventions.

What is claimed is:

1. A method for managing operation of a computing system, comprising:
    determining a number of workloads on the computing system;
    determining a number of performance-power states for each workload and a corresponding performance range and power consumption range for each performance-power state, wherein determining the number of performance-power states comprises determining a plurality of architectural features utilized by each workload, disabling one or more of the architectural features, and operating an input/output communication link at a lower bandwidth; and
    managing performance and power consumption of the computing system based on the performance-power states.

2. The method of claim 1, comprising determining parameters corresponding to each workload by specifying a definition of performance for each workload.

3. The method of claim 2, wherein the definition of performance is based on architectural features of the computing system.

4. The method of claim 2, comprising receiving the definition of the performance for each workload from a user via a user interface.

5. The method of claim 1, wherein determining the number of performance-power states for each workload comprises:
    running each workload in each system operational state;
    measuring a performance of the computing system for each workload in each system operational state; and measuring a power consumption of the computing system for each workload in each system operational state.

6. The method of claim 1, comprising managing operation of the computing system in response to input from a system management agent.

7. The method of claim 6, wherein managing operation of the computing system comprises:
maintaining the power consumption below a predefined power limit; and
maintaining the performance at a predefined performance level.

8. The method of claim 1, wherein each performance-power state is separated from a previous performance-power state and a next performance-power state by a minimum power consumption and a minimum performance.

9. The method of claim 1, comprising:
determining a number of workloads corresponding to a plurality of computing systems and parameters corresponding to each workload;
determining a number of performance-power states for each workload and a corresponding performance range and power range for each performance-power state; and
managing performance and power consumption of the plurality of computing systems based on the performance-power states.

10. The method of claim 9, comprising managing operation of the plurality of computing systems in response to input from a datacenter manager located outside of the plurality of computing systems.

11. The method of claim 9, wherein managing the performance and the power consumption of the plurality of computing systems comprises maintaining an overall power consumption of the plurality of computing systems below a power limit while maintaining the performance of the plurality of computing systems at a uniform performance level.

12. The method of claim 1, wherein determining the number of performance-power states comprises varying a display refresh rate, and reducing a number of instructions executed by a vector processing unit in a period of time.

13. A computing system, comprising:
a processor that is adapted to execute stored instructions; and
a storage device that stores instructions, the storage device comprising processor executable code that, when executed by the processor, is adapted to:
determine a number of workloads of the computing system;
determine a number of performance-power states for each workload, wherein determining a performance-power state comprises defining a performance level range and a power level range for the performance-power state and wherein determining the number of performance-power states comprises determining a plurality of architectural features utilized by each workload, disabling one or more of the architectural features, and operating an input/output communication link at a lower bandwidth; and
manage performance and power consumption of the computing system based on the performance-power states.

14. The computing system of claim 13, wherein a system operational state comprises a state in which the computing system is capable of running a specific workload by varying configurable parameters.

15. The computing system of claim 13, wherein the performance-power state comprises a state in which the computing system is capable of running a specific workload within the performance level range and the power level range.

16. The computing system of claim 13, wherein the processor executable code is executed by the processor during an initial system boot.

17. The computing system of claim 13, wherein the processor executable code is executed by the processor by an operating system on demand.

18. The computing system of claim 13, wherein the processor executable code is executed by the processor as a response to a request by a user of another computing system.

19. The computing system of claim 13, wherein the processor executable code is adapted to use the performance-power states to achieve a balance between the performance and the power consumption of the computing system.

20. The computing system of claim 13, wherein each performance-power state is separated from a previous performance-power state and a next performance-power state by a minimum power consumption and a minimum performance.

21. At least one non-transitory machine readable medium having instructions stored therein that, in response to being executed on a computing system, cause the computing system to:
determine a number of workloads of the computing system;
determine a number of performance-power states for each workload and a corresponding performance range and power range for each performance-power state, wherein determining the number of performance-power states comprises determining a plurality of architectural features utilized by each workload, disabling one or more of the architectural features and operating an input/output communication link at a lower bandwidth; and
control performance and power consumption of the computing system based on the performance-power states.

22. The at least one non-transitory machine readable medium of claim 21, wherein a system operational state comprises a state in which the computing system is capable of running a specific workload by varying configurable parameters.

23. The at least one non-transitory machine readable medium of claim 21, wherein a performance-power state comprises a state in which the computing system is capable of running a specific workload within a specified performance level range and a specified power level range.

24. The at least one non-transitory machine readable medium of claim 21, wherein the instructions cause the computing system to determine parameters corresponding to each workload by specifying a definition of performance for each workload based on any of a plurality of architectural features of the computing system.

25. The at least one non-transitory machine readable medium of claim 21, wherein controlling the performance and the power consumption of the computing system comprises maintaining a highest performance of the computing system at a given rate of power usage.

* * * * *